United States Patent
Iyer et al.

(10) Patent No.: US 11,238,134 B2
(45) Date of Patent: Feb. 1, 2022

(54) ADAPTABLE ACCESS TO DIGITAL ASSETS

(71) Applicant: International Business Machines Corporation, Armonk, NY (US)

(72) Inventors: Sreekanth R. Iyer, Bangalore (IN); Sulakshan Vajipayajula, Bangalore (IN); Manoj Palat, Bangalore (IN); Sridhar Muppidi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 16/011,243

(22) Filed: Jun. 18, 2018

(65) Prior Publication Data
US 2019/0384891 A1 Dec. 19, 2019

(51) Int. Cl.
*H04L 29/06* (2006.01)
*G06F 21/10* (2013.01)
*G06F 21/62* (2013.01)

(52) U.S. Cl.
CPC ........ *G06F 21/105* (2013.01); *G06F 21/6209* (2013.01); *H04L 63/0442* (2013.01)

(58) Field of Classification Search
CPC . G06F 21/105; G06F 21/6209; H04L 63/0442
See application file for complete search history.

(56) References Cited

U.S. PATENT DOCUMENTS

| | | | | |
|---|---|---|---|---|
| 7,627,652 B1* | 12/2009 | Commons | ........... | H04L 67/1097 709/213 |
| 2008/0167994 A1 | 7/2008 | Li | | |
| 2013/0254536 A1* | 9/2013 | Glover | ................ | G06F 21/6209 713/165 |
| 2014/0279450 A1 | 9/2014 | Gujral | | |
| 2015/0081495 A1 | 3/2015 | Randall | | |
| 2015/0195254 A1* | 7/2015 | Stiglic | ................... | H04L 9/0825 713/171 |
| 2016/0182240 A1* | 6/2016 | Nayshtut | ............. | H04L 63/0815 713/158 |
| 2016/0260187 A1* | 9/2016 | Rajagopalan | .......... | G06Q 40/06 |
| 2017/0034182 A1 | 2/2017 | Marson et al. | | |
| 2018/0315143 A1* | 11/2018 | Rang | ........................ | G06N 5/04 |
| 2020/0012763 A1* | 1/2020 | Arngren | .............. | G06F 16/2379 |

OTHER PUBLICATIONS

Lee et al. A Practical Approach to a Secure E-Will System in the R.O.C, Dec. 1, 2010, IEEE conference, 2010 Proceedings of the 5th International Conference on Ubiquitous Information Technologies and Applications (pp. 1-6) (Year: 2010).*

Ghani et al. "A Sentiment-Based Filteration and Data Analysis Framework for Social Media", Proceedings of the 5th International Conference on Computing and Informatics; Aug. 2015.

(Continued)

*Primary Examiner* — Taghi T Arani
*Assistant Examiner* — Lin Chang
(74) *Attorney, Agent, or Firm* — Michael O'Keefe

(57) ABSTRACT

A framework system is present that provides an end-to-end solution for user on-boarding, storing, securing, configuring, authenticating of the target person (grantee user), and transmittal of digitized documents assets. The framework system is preferably a multi-tenant cloud based system, although other systems may be used. The system processes multiple inputs to cognitively determine implementation (cognitive decision making) of digitized assets to a grantee user or target user without human intervention.

12 Claims, 6 Drawing Sheets

(56) References Cited

OTHER PUBLICATIONS

"DigiLocker—Your documents anytime, anywhere", retrieved from https://digilocker.gov.in/; as early as Feb. 2015.
"Add or remove protection in your document, workbook, or presentation", retrieved from https://support.office.com/en-us/article/Add-or-remove-protection-in-your-document-workbook-or presentation-05084cc3-300d-4c1a-8416-38d3e37d6826; as early as Oct. 2015.
Dash, D. "Now drive with soft copy, keep your licence in DigiLocker", retrieved from https://timesofindia.indiatimes.com/Now-drive-with-soft-copy-keep-your-licence-in-DigiLocker/articleshow/54023618.cms; Sep. 2016.
"Life Certificate Authentication", retrieved from https://www.india.gov.in/spotlight/jeevan-pramaan-digital-life-certificate-pensioners#tab=tab-1; as early as Dec. 2014.
"Digital Inheritance Vault", retrieved from https://www.makemeawill.com/estate-planning-services/digital-inheritance-vault/; as early as Mar. 2004.
"The Safe4 Digital Inheritance Vault", retrieved from https://www.safe-4.co.uk/digital-inheritance-vault/; as early as Jun. 2010.
"Legacy Vault", retrieved from https://www.legacyvault.com/; as early as Mar. 2004.
"Your Digital Inheritance: What Happens to Your Social Media Accounts When You Die?", retrieved from https://www.huffingtonpost.com/entry/your-digital-inheritance-what-happens-to-your-social_us_589e65a1e4b0cd37efcfe8a4; Feb. 2017.
Khan, K. "The power of e-will", retrieved from http://www.thehindu.com/features/magazine/a-look-at-the-concept-of-digital-inheritance-the-power-of-ewill/article7309176.ece; Jun. 2015.
"The digital beyond", retrieved from http://www.thedigitalbeyond.com/online-services-list/datainherit/; as early as Oct. 2010.
Swallow, E. "7 Resources for Handling Digital Life After Death", retrieved from https://mashable.eom/2010/10/11/social-media-after-death/#7dzy9h2ibGqp; Oct. 2010.
Purewall, S. "How to prepare for your digital afterlife", retrieved from https://www.cnet.com/how-to/how-to-prepare-for-your-digital-afterlife/; Mar. 2016.

\* cited by examiner

ADAPTABLE ACCESS TO DIGITAL ASSETS

BACKGROUND

The present invention relates to secure access to files, and more specifically to adaptable access to digital assets based on events associated with the owner of the digital assets.

Assets of people are becoming increasingly digital in nature, with most documents, bank accounts and other assets being stored digitally. Most of the assets are protected or secured through passwords or other authentication means. When an owner of the assets is not available for an extended period of time, these assets suddenly become inaccessible unless the owner has provided the digital asset details to another user, which is generally very rare in practice. Currently, when an owner of assets is not available for an extended period of time, another user can attempt to use authentication through various means, such as a soft copy of a verified license with a company or institution holding and storing the secured documents. A drawback of this solution is that there is human intervention present; a third party who is entrusted to execute the authentication for access to the documents.

SUMMARY

According to one embodiment of the present invention, a method of a grantor user conveying digital assets to a grantee user is disclosed. The method comprising the steps of: monitoring for information regarding the grant's user status; calculating the grantor user's status based on the monitored information and a set of grantor user defined grant rules associated with the digital assets to be conveyed to the grantee user, wherein the grant rules set thresholds for conveying the digital assets to the grantee user; notifying a grantee user when the grantor user's status fails to surpass a threshold in the grant rules; receiving at least a personal ID number associated with the grantee user; displaying digital assets granted to the grantee user; and for all digital assets accepted by the grantee user from the grantor user: decrypting the digital asset using a private key of the grantee user; obtaining a private key of the grantor user associated with the digital asset; processing the grant of the digital asset by decrypting the digital asset using the grantor user's private key; and processing the decrypted grant of the digital asset according to the grant rules set by the grantor user.

According to another embodiment of the present invention a computer program product for a grantor user conveying digital assets to a grantee user is disclosed. The compute program product using a computer comprising at least one processor, one or more memories, one or more computer readable storage media, the computer program product comprising a computer readable storage medium having program instructions embodied therewith, the program instructions executable by the computer to perform a method comprising: monitoring, by the computer, for information regarding the grant's user status; calculating, by the computer, the grantor user's status based on the monitored information and a set of grantor user defined grant rules associated with the digital assets to be conveyed to the grantee user, wherein the grant rules set thresholds for conveying the digital assets to the grantee user; notifying, by the computer, a grantee user when the grantor user's status fails to surpass a threshold in the grant rules; receiving, by the computer, at least a personal ID number associated with the grantee user; displaying, by the computer, digital assets granted to the grantee user; and for all digital assets accepted by the grantee user from the grantor user the computer: decrypting the digital asset using a private key of the grantee user; obtaining a private key of the grantor user associated with the digital asset; processing the grant of the digital asset by decrypting the digital asset using the grantor user's private key; and processing the decrypted grant of the digital asset according to the grant rules set by the grantor user.

According to another embodiment of the present invention, a computer system for a grantor user conveying digital assets to a grantee user is disclosed. The computer system comprising a computer comprising at least one processor, one or more memories, one or more computer readable storage media having program instructions executable by the computer to perform the program instructions comprising: monitoring, by the computer, for information regarding the grant's user status; calculating, by the computer, the grantor user's status based on the monitored information and a set of grantor user defined grant rules associated with the digital assets to be conveyed to the grantee user, wherein the grant rules set thresholds for conveying the digital assets to the grantee user; notifying, by the computer, a grantee user when the grantor user's status fails to surpass a threshold in the grant rules; receiving, by the computer, at least a personal ID number associated with the grantee user; displaying, by the computer, digital assets granted to the grantee user; and for all digital assets accepted by the grantee user from the grantor user the computer: decrypting the digital asset using a private key of the grantee user; obtaining a private key of the grantor user associated with the digital asset; processing the grant of the digital asset by decrypting the digital asset using the grantor user's private key; and processing the decrypted grant of the digital asset according to the grant rules set by the grantor user

DETAILED DESCRIPTION

Figure 1:
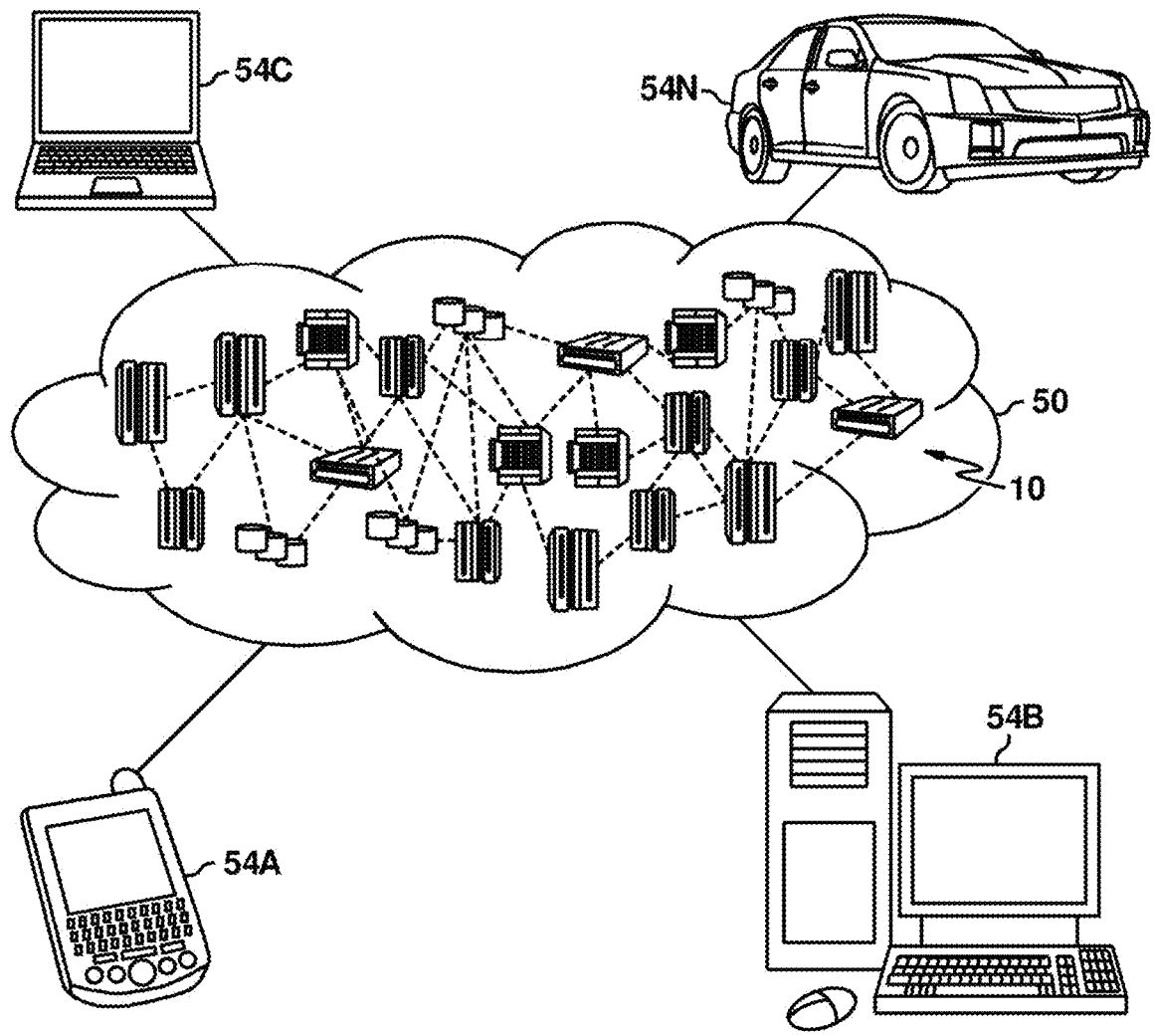
FIG. 1 depicts a cloud computing node according to an embodiment of the present invention.

In an embodiment of the present invention, a framework system is present that provides an end-to-end solution for user on-boarding, storing, securing, configuring, authenticating of the target person (grantee user), and transmittal of digitized documents assets. The framework system is preferably a multi-tenant cloud based system, although other systems may be used. The system processes multiple inputs to cognitively determine implementation (cognitive decision making) of digitized assets to a grantee user or target user without human intervention. Existing methods do not provide an end-to-end solution for after-life management of digital documents associated with a grantor user. Existing methods also require human intervention.

A digital asset is a purchase, document, information, money or other data stored digitally.

For example, the framework system of an embodiment of the present invention uses cognitive decision making, based on an owner's (grantor user's) leaving their digital assets to a beneficiary or target person. In the process of defining this workflow, there is an option of keeping a "safety valve" which would allow the beneficiary or grantee user to take control in some extraordinary circumstances or after specific events. The robustness of this decision making allows the grantee user to receive the digital assets of the owner (grantor user) only at the specified time deemed by the owner.

A trigger function determines a trigger index which can be created for each grantor user whose complexity can vary from a basic function to highly complex cognitive trigger function dependent on the digital asset. This trigger function is used to break open the safety valve enabling the grantee user the access to the digital assets.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
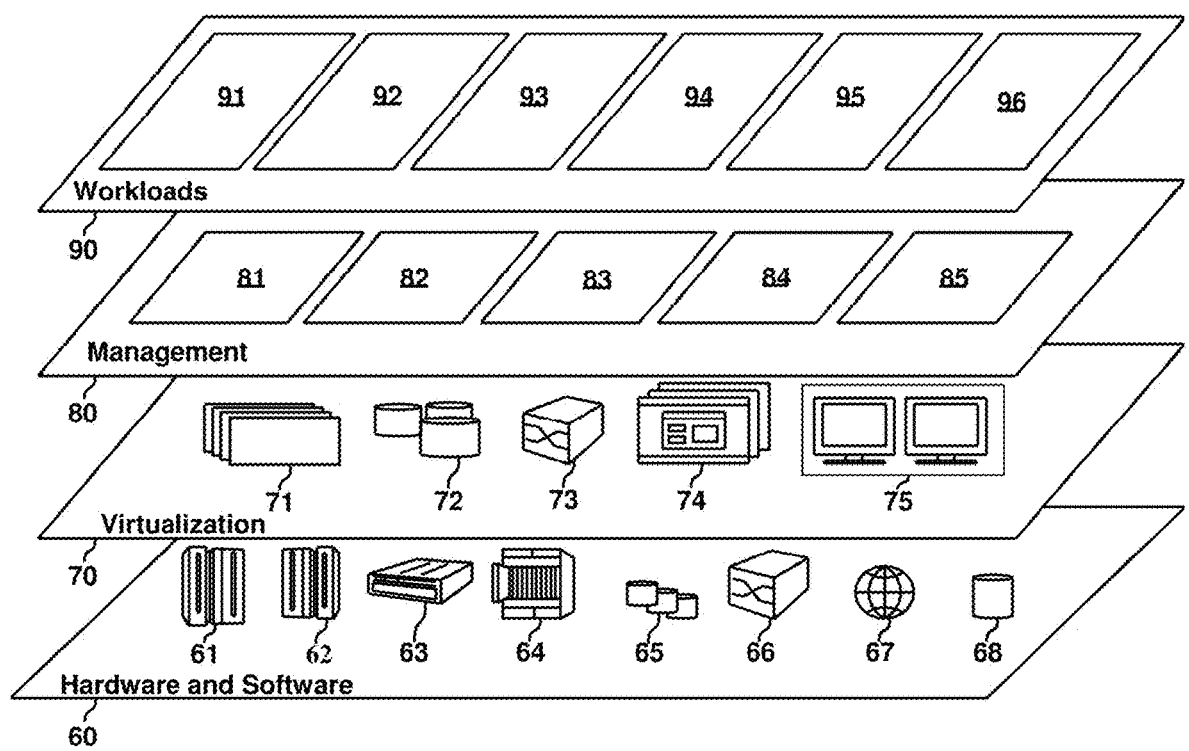
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure digital asset accessibility 96.

Figure 3:
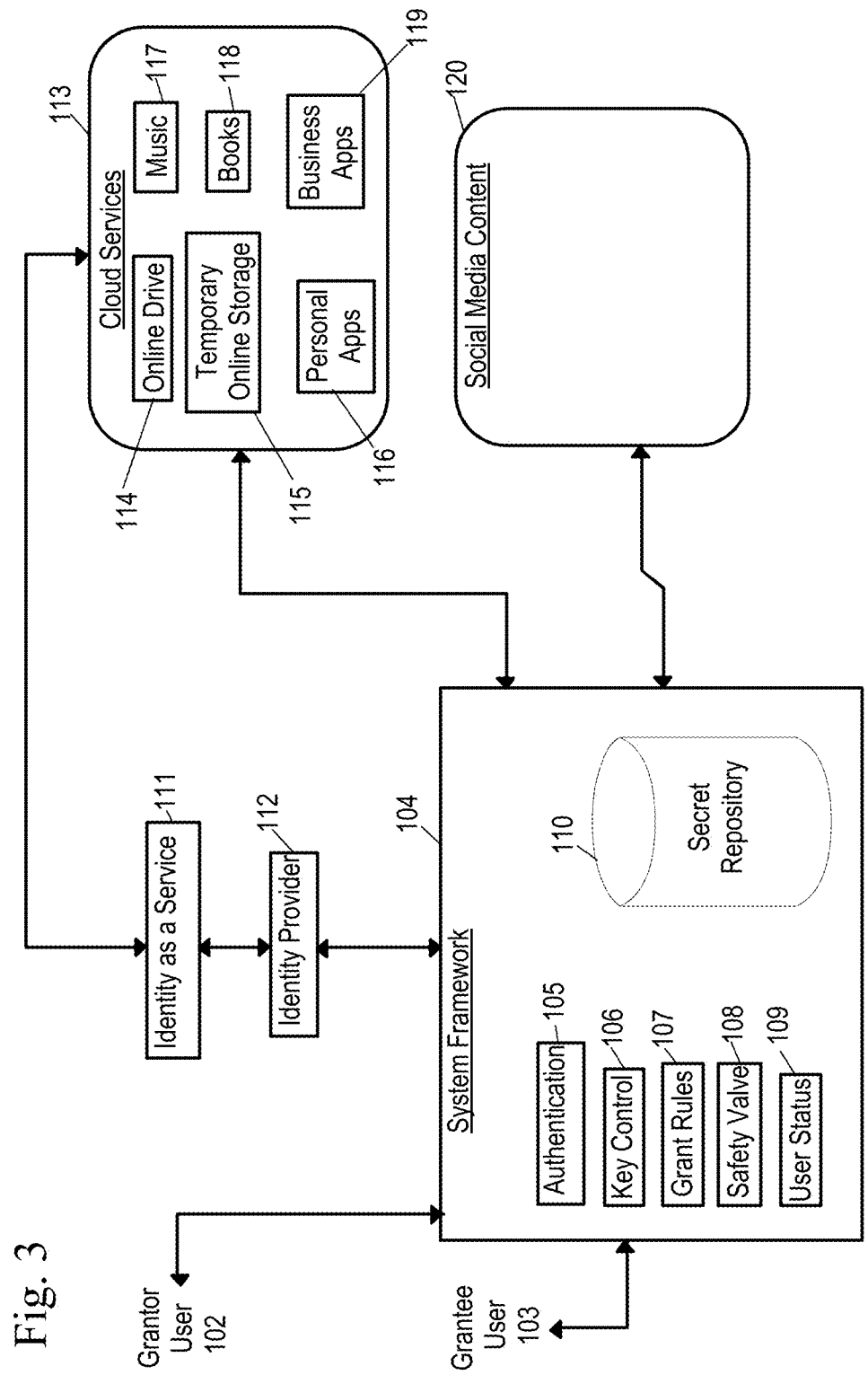
FIG. 3 shows a schematic of an example of the system framework.

FIG. 3 shows a schematic of an example of the system framework.

The system framework 104 is preferably includes a multi-tenanted cloud based service. The system framework 104 preferably includes, but is not limited to authentication service 104, encryption key control 106, grant rules 107, safety valve 108, user status 109 and an encrypted or secret repository 110.

Through the system framework 104, the grantor user 102 can use the system to assign heirs or grantee users to their digital assets. The grantor user 102 can specify the grantee users 103 by specifying a personal ID number of the grantee user 103. This number can also be designated by the system framework 104. The grantor user 102 can assign multiple digital assets to one grantee user 103 or a single asset to multiple grantee users 103.

The authentication service 104 authenticates grantee users and grantor users via biometrics, username, passwords, and personal ID numbers. Other means of authentication are also possible.

The encrypted repository 110 can store credentials to online digital services, such as cloud services 113 and social media content 120 of the grantor user 102 and other documents and digital assets of the grantor user 102. The encrypted repository 110 keeps data encrypted, for example using a composite key generated from user biometrics and the provider's private key.

A pair of public and private keys are generated for each user, grantor user 102 and grantee user 103. The keys are always generated at the client side and the server does not receive the keys until a grant is being processed by the framework 104, for example by the encryption key control 106. The data encryption key is the grantor's private key which is encrypted with a grantee public key.

The grant rules 107 are rules in which the grantor user 102 has determined are applied and executed relative to their specific digital assets. For example, the grantor user 102 can specify which biometrics are necessary for the encryption/decryption process, such as fingerprint, iris scan, and/or voice or a combination of biometric measurements.

When grantee users 103 are informed about the inheritance or access to a grantor user's digital assets, the grantee user's 103 biometrics can also be provided to add additional security. If no biometrics associated with the grantee user 103 are present, just a personal identification number, such as the "aadhaar number" issued to residents of India or similar ID numbers issued in other countries, or a passport or driver's license or social security number as are issued in the USA, can be used.

The grant rules 107 might require, for example, (a) setting the "legacy contact" for a Facebook® account to be the grantee; (b) calling the API to initiate the Google "inactive manager"; (c) allow rules-based access to a "secret store"; or (d) inform an "Identity as a Service" provider to block all cloud services access. These grant rules 107 can be executed in parallel or in a specified sequence.

User status 109 monitors events for a user's status. The status may include, but is not limited to location of the user, health condition of the user, cognitive ability of the user, and living status of the user.

The safety valve 108 preferably has cognitive decision making capabilities to determine if the grantor user 102 is living or not. For example, the safety valve 108 can monitor for and determine whether the grantor user has accessed any digital content for specified number of days, or the last location the grantor user shared reports from. The safety valve might also monitor services which, for example, reprint obituaries, monitor social security survivor's claims, or report grave locations.

If the safety valve determines that the grantor user 102 is not living, the grant rules are executed.

The system framework 104 can leverage social media content 120, which can include, but is not limited to Facebook®, LinkedIn®, Twitter®, location sharing, Instagram® and e-mail.

The system framework 104 additionally leverages other cloud services 113, such as but not limited to, music 117, books 118, business applications 119, personal application 116, online drive 114, and temporary online storage 115.

The cloud services 113 are identified as a service 111 and are used to identify a user 112, such as the grantor user 102 and the grantee user 103. The identification preferably leverages a biometrics-enabled identity provider like aadhaar for user authentication. Aadhaar is a 12-digit unique personal identity (ID) number issued in India that is based on a user's biometric and demographic data.

The system framework 104 is accessible by the grantor user 102 or the grantee user 103 via a web based client, mobile device or other computing device.

Figure 4:
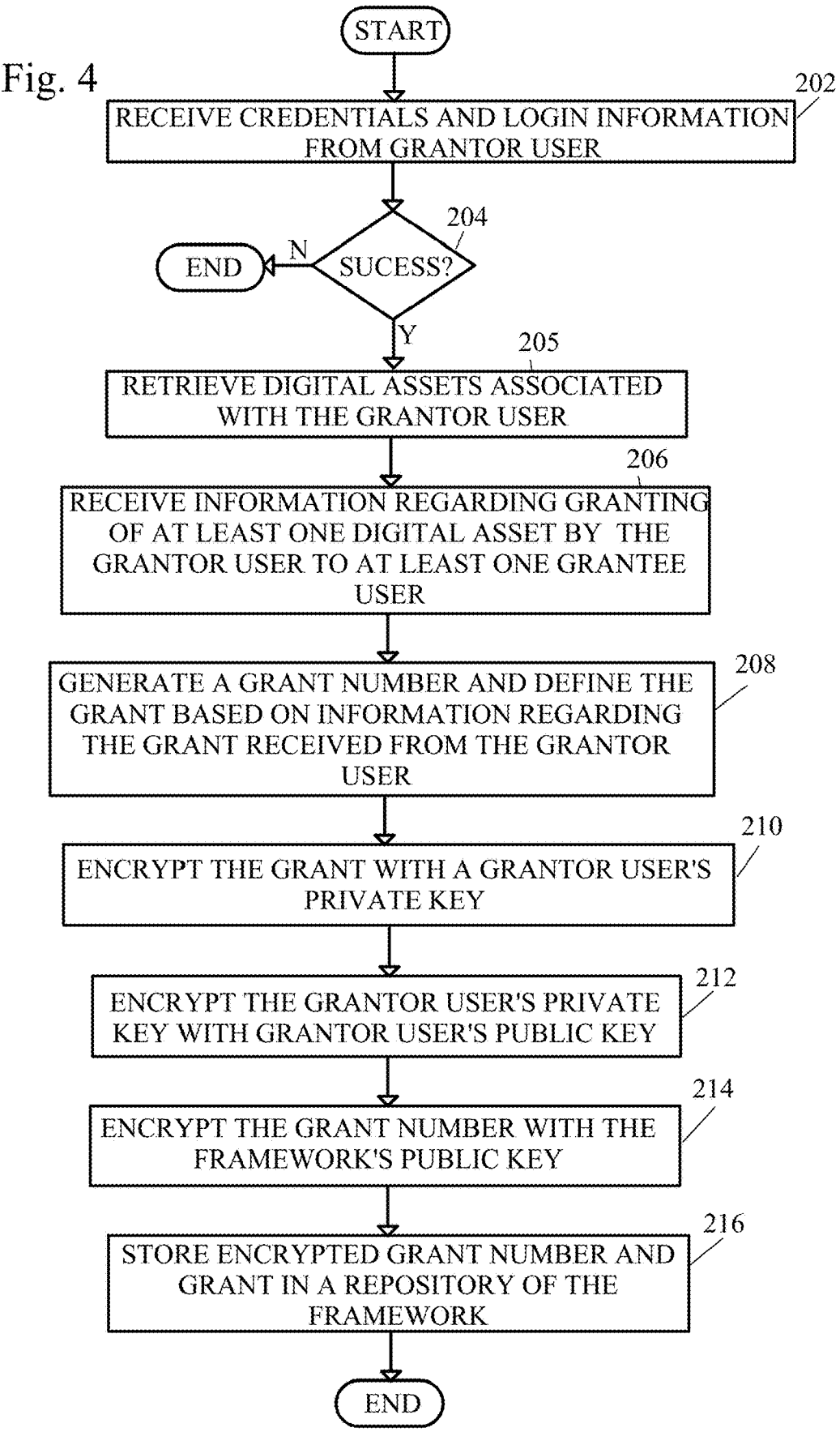
FIG. 4 shows a flow diagram of a method of a grantor user establishing a safety valve for a grantor user's assets.

FIG. 4 shows a flow diagram of a method of a grantor establishing a safety valve for a grantor's assets.

In a first step (step 202), the system framework 104 receives credentials and login information from a grantor user 102. The login information may include a user name and password may be preregistered with the system framework 104 prior to step 202. The credentials preferably include biometrics of the grantor user 103. The private and public keys of the grantor user 103 are also generated during this first step.

If the login information and credentials, for example by the authentication service 104, are deemed incorrect (step 204), the method ends.

If the login information and credentials are deemed correct, for example by the authentication service 104 (step 204), the system framework 104 retrieves digital assets associated with the grantor user 102 (step 205). For digital assets without at least one grantee user 103 assigned, the system framework 104 receives information regarding granting of at least one digital asset by the grantor user to at least one grantee user (step 206). The information preferably includes what digital assets, the grantee user and their associated personal ID number and what grant rules are to be followed in order for the inheritance of the digital assets to take place.

The system framework 104 generates a grant number and defines the grant rules based on the information regarding the grant received from the grantor user (step 208).

The system framework 104, via the key control 106, encrypts the grant with a grantor user's private key (step 210).

The system framework 104 then encrypts the grantor user's private key with the grantor user's public key (step 212).

The system framework 104 then encrypts the grant number with the framework's public key (step 214) and the system framework stores the encrypted grant number and grant rules in the repository of the system framework (step 216) and the method ends.

Figure 5:
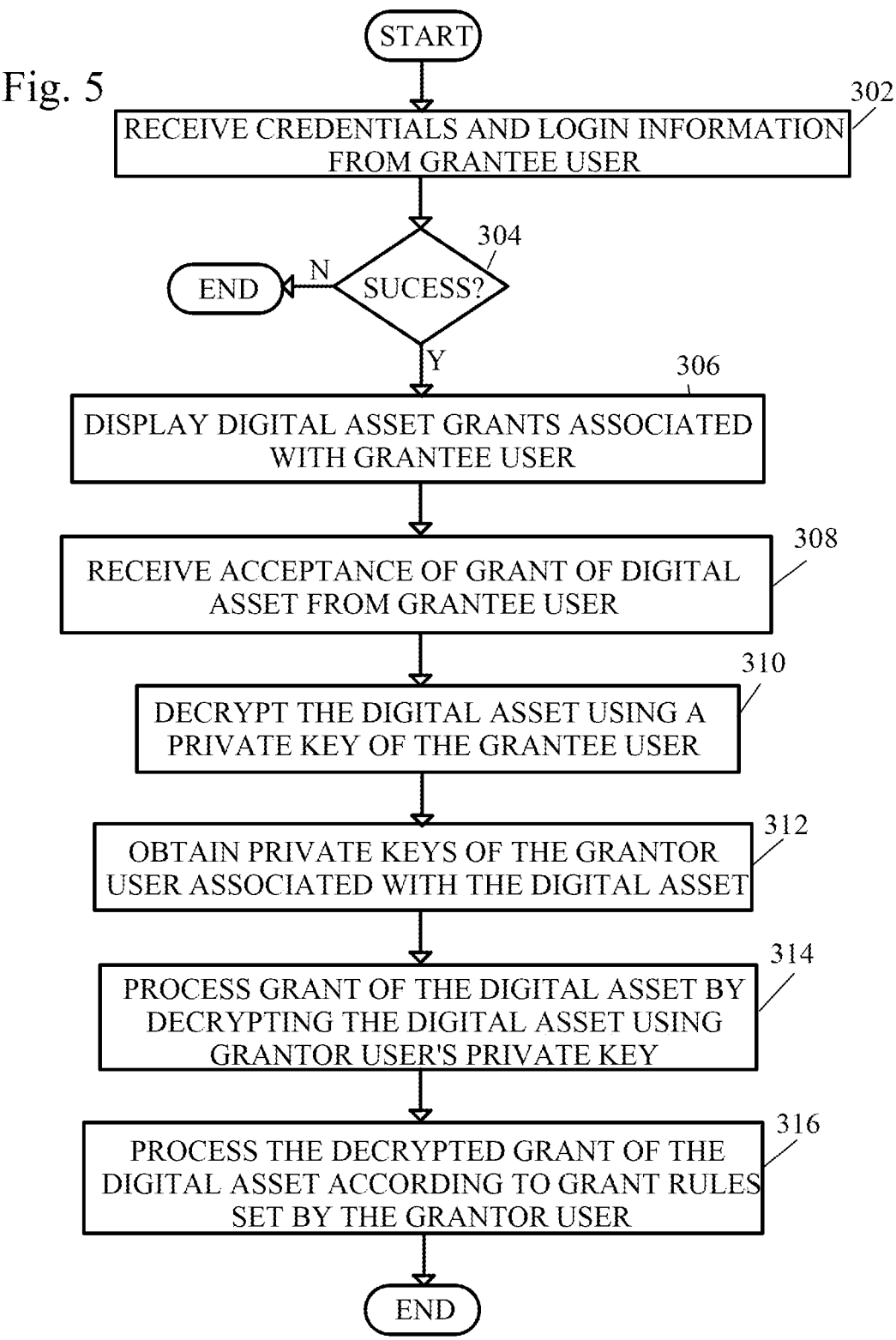
FIG. 5 shows a flow diagram of a method of a grantee user receiving a grantor user's designated digital assets.

FIG. 5 shows a flow diagram of a method of a grantee receiving a grantor's designated digital assets.

It should be noted that prior to grantee user 103 logging into the system framework 104, the grantee user 103 may be notified by the system framework 104 regarding the grantor user's 102 demise or unavailability. The notification trigger to the grantee user 103 regarding the grantor user's 102 status is discussed below relative to FIG. 6.

In a first step, the system framework receives login information from a grantee user (step 302). The login information can be biometrics and/or a personal ID number associated with the grantee user 103.

If the login information and credentials are deemed incorrect, for example by the authentication service 104 (step 304), the method ends.

If the login information and credentials are deemed correct, for example by the authentication service 104 (step 304), the system framework 104 displays digital asset grants associated with the grantee user (step 306).

For each digital asset grant in which the system framework 104 receives an acceptance of from the grantee user (step 308), decrypt the digital asset using a private key of the grantee user (step 310).

The system framework 104 then obtains private keys of the grantor user 102 associated with the digital asset and the grant is stored in the repository (step 312).

Next, the system framework 104 processes the grant of the digital asset by decrypting the digital asset with the grantor user's private key (step 314) and processing the grant of the digital asset according to the grant rules set by the grantor user (step 316) and the method ends.

Figure 6:
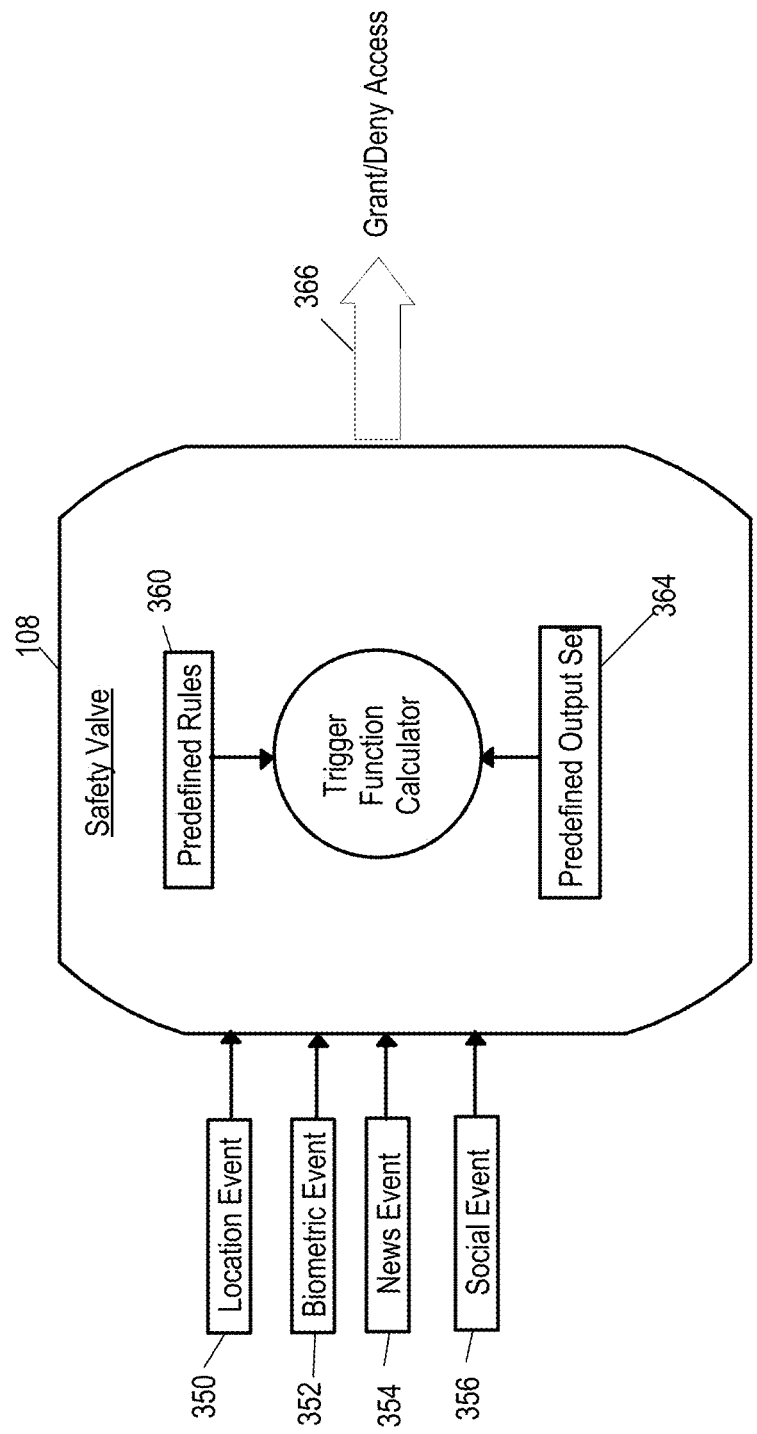
FIG. 6 shows a schematic of safety valve of FIG. 3.

FIG. 6 shows a schematic of safety valve 108 of FIG. 3. The safety valve 108 processes the grant rules 107 set by the grantor user 102 during processing of a grant of digital assets to a grantee user 103, for example in step 314 of the flow diagram of FIG. 5.

The safety valve 108 receives input from, but not limited to location events 350, biometric events 352, news events 354 and social events 356.

The safety valve 108 includes a set of predefined rules 360 which may be altered and customized by the grantor user 102. The predefined rules are used as input for a trigger function calculator 362.

The notification to a grantee user 103 regarding a status of a grantor user 102 is based on a trigger function and the notification or output may also be based on predefined set of rules 364, which may be customized by the grantor user 102. The customization of the output of the safety valve 108 can be based on levels of access based on the trigger function. The output 366 includes whether the grantee user 103 is denied granted access or granted partial access to digital assets and for what time period. For example, a grantee can be granted access to certain documents or digital assets based on a grantor user being in the hospital for a month versus the grantor user having passed away.

The trigger function includes a trigger index which can be customized by a grantor user 102. The trigger index can vary in complexity and data used to determine whether to notify a grantee user 103, enabling the grantee user 103 access to the digital assets of the grantor user 102.

For example, a trigger index can be calculated as a combination of the below parameters:

$$T(x) = \sum_{\substack{k=0 \\ j=0}}^{n} Rj\binom{x}{k} f(x)g(k)$$

Where:
T(x) is the trigger
T is the trigger index for the personal ID number (such as an aadhaar number) x
Rj is a relationship function
k is a secondary owner
f(x) is an event function
g is a secondary safe trigger for the given secondary owner k
Therefore, the trigger T(x) is calculated as a summation of the existence of a relationship function Rj for a given secondary owner k, multiplied over event function f(x) [e.g. death] and a secondary safe trigger function g for the given secondary owner k. In the degenerate case that there is only one owner at any given point of time, k reduces to 1.

The trigger index can be calculated with an assigned a probability function that can decrease or increase the weightage of the function. If the probability of the trigger index is below a threshold value, the digital assets are granted to the grantee user. The rules regarding the trigger index can be interpreted by a rule-parser-verifier which will check the validity of the rule application to the trigger index.

The safety valve 108 can include cognitive decision making capabilities to predict whether an event has happened or not, and based on the prediction decide to prevent access to digital assets for specific time period using event analysis. The cognitive decision making capabilities can be implemented on the cloud as a service. Multiple events can be used as input—location event, news event, social event, bio-metric event. The events can receive weights as set in the predefined rules. For example, a news report regarding a death of a grantor user would receive high weight in calculating whether to trigger a notification to a grantee user of digital assets. Cognitive decision making capabilities can be combined with geo-local information for additional safety. Location information regarding the grantor user can also be merged with biometric information for increased accuracy.

Example 1

A grantor user manages their monetary assets online has an amassed wealth present in stocks and bank deposits as well as health insurance documents. The documents concerning the amassed wealth are stored digitally in an online drive and on a personal computer of the user. In other words, the grantor user has secured data regarding digital assets, but with a single access point.

Conventionally if the grantor user were to suffer a catastrophic event in which the grantor user is not available to provide that single access to the amassed wealth, another user would need to spend significant amounts of time, through human intervention to attempt to gain access to the digital assets of the grantor user.

In an embodiment of the present invention, if the user were to suffer a catastrophic event and is not available to provide access to the amassed wealth, but the amassed wealth is required, a grantee user would be notified by the system framework based off the catastrophic event being triggered and the grantee user could be granted access to the digital assets through biometrics and a personal ID number of the grantee user to secure access to the amassed wealth.

Example 2

Three users are present in a partnership and deal with sensitive documents which secured and stored in a repository which grants access through authentication of biometrics of the three users. One of the partners is unreachable due to their location and will be unavailable for a prolonged period of time. Using cognitive decision making capabilities based on location events executed through location trigger capabilities (e.g. last location of a biometric reading of the user partner which is unreachable) and other events, for example news events, could trigger limited authentication access to be granted for a specific time period to the other two users of the partnership based on predefined output rules. The trigger function could be executed again after the specific time period, to determine whether the limited authentication should continue.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of a grantor user conveying prototypical digital assets of the grantor user to a grantee user comprising:
   monitoring for information regarding a grantor user's status, wherein the information comprises location events, biometric events, news events, and social events, and wherein the grantor user's status is selected from a group consisting of a location of the grantor, a health condition of the grantor, a cognitive ability of the grantor, and a living status of the grantor;
   calculating a trigger index based on the information events and a set of grantor user defined grant rules of a grant, which set thresholds for conveying the prototypical digital assets to the grantee user, to determine a conveyance of the prototypical digital assets to the grantee user, wherein the conveyance occurs when the trigger index is below a threshold value, wherein the thresholds comprising a time period and at least one event associated with the digital assets to be conveyed to the grantee user, and wherein the trigger index is calculated based on a weighted probability function associated with one or more monitored events;
   notifying a grantee user when the grantor user's status fails to surpass a threshold in the grant rules of the grant;
   receiving at least a personal ID number associated with the grantee user;
   displaying prototypical digital assets granted to the grantee user; and
   for all prototypical digital assets accepted by the grantee user from the grantor user:
   decrypting the prototypical digital asset using a private key of the grantee user;
   obtaining a private key of the grantor user associated with the prototypical digital asset;
      processing the grant of the prototypical digital asset by decrypting the grant using the grantor user's private key; and
      processing the decrypted grant of the prototypical digital asset according to the thresholds set in the grant rules set by the grantor user.

2. The method of claim 1, wherein the grantee user further provides biometrics to access the prototypical digital assets.

3. The method of claim 1, wherein the grant of the prototypical digital assets by the grantor user to the grantee user is for a set time period and is temporary.

4. The method of claim 1, wherein the grant of the prototypical digital assets by the grantor user to the grantee user is permanent.

5. A computer program product for a grantor user conveying prototypical digital assets of the grantor user to a grantee user using a computer comprising at least one processor, one or more memories, one or more computer readable storage media, the computer program product comprising a computer readable storage medium having program instructions embodied therewith, the program instructions executable by the computer to perform a method comprising:
   monitoring, by the computer, for information regarding a grantor user's status, wherein the information comprises location events, biometric events, news events, and social events, and wherein the grantor user's status is selected from a group consisting of a location of the grantor, a health condition of the grantor, a cognitive ability of the grantor, and a living status of the grantor;
   calculating, by the computer, a trigger index based on the information events and a set of grantor user defined grant rules of a grant, which set thresholds for conveying the prototypical digital assets to the grantee user, to determine a conveyance of the prototypical digital assets to the grantee user, wherein the conveyance occurs when the trigger index is below a threshold value, wherein the thresholds comprising a time period and at least one event associated with the digital assets to be conveyed to the grantee user, and wherein the trigger index is calculated based on a weighted probability function associated with one or more monitored events;

notifying, by the computer, a grantee user when the grantor user's status fails to surpass a threshold in the grant rules of the grant;

receiving, by the computer, at least a personal ID number associated with the grantee user;

displaying, by the computer, prototypical digital assets granted to the grantee user; and for all prototypical digital assets accepted by the grantee user from the grantor user the computer:

decrypting the prototypical digital asset using a private key of the grantee user;

obtaining a private key of the grantor user associated with the prototypical digital asset;

processing the grant of the prototypical digital asset by decrypting the grant using the grantor user's private key; and processing the decrypted grant of the prototypical digital asset according to the thresholds set in the grant rules set by the grantor user.

6. The computer program product of claim 5, wherein the grantee user further provides biometrics to access the prototypical digital assets.

7. The computer program product of claim 5, wherein the grant of the prototypical digital assets by the grantor user to the grantee user is for a set time period and is temporary.

8. The computer program product of claim 5, wherein the grant of the prototypical digital assets by the grantor user to the grantee user is permanent.

9. A computer system for a grantor user conveying prototypical digital assets of the grantor user to a grantee user, the computer system comprising a computer comprising at least one processor, one or more memories, one or more computer readable storage media having program instructions executable by the computer to perform the program instructions comprising:

monitoring, by the computer, for information regarding a grantor user's status, wherein the information comprises location events, biometric events, news events, and social events, and wherein the grantor user's status is selected from a group consisting of a location of the grantor, a health condition of the grantor, a cognitive ability of the grantor, and a living status of the grantor;

calculating, by the computer, the grantor user's status based on the monitored information and a set of grantor user defined grant rules associated with the digital assets to be conveyed to the grantee user, wherein the grant rules set thresholds for conveying the digital assets to the grantee user;

monitoring, by the computer, for information regarding a grantor user's status;

calculating, by the computer, a trigger index based on the information events and a set of grantor user defined grant rules of a grant, which set thresholds for conveying the prototypical digital assets to the grantee user, to determine a conveyance of the prototypical digital assets to the grantee user, wherein the conveyance occurs when the trigger index is below a threshold value, wherein the thresholds comprising a time period and at least one event associated with the digital assets to be conveyed to the grantee user, and wherein the trigger index is calculated based on a weighted probability function associated with one or more monitored events;

notifying, by the computer, a grantee user when the grantor user's status fails to surpass a threshold in the grant rules of the grant;

receiving, by the computer, at least a personal ID number associated with the grantee user;

displaying, by the computer, prototypical digital assets granted to the grantee user; and for all prototypical digital assets accepted by the grantee user from the grantor user the computer:

decrypting the prototypical digital asset using a private key of the grantee user;

obtaining a private key of the grantor user associated with the prototypical digital asset;

processing the grant of the prototypical digital asset by decrypting the grant using the grantor user's private key; and processing the decrypted grant of the prototypical digital asset according to the thresholds set in the grant rules set by the grantor user.

10. The computer system of claim 9, wherein the grantee user further provides biometrics to access the prototypical digital assets.

11. The computer system of claim 9, wherein the grant of the prototypical digital assets by the grantor user to the grantee user is for a set time period and is temporary.

12. The computer system of claim 9, wherein the grant of the prototypical digital assets by the grantor user to the grantee user is permanent.

* * * * *